(12) United States Patent
Rajagopalan et al.

(10) Patent No.: US 12,141,287 B2
(45) Date of Patent: Nov. 12, 2024

(54) ENABLING FLEXIBLE POLICIES FOR BIOS SETTINGS ACCESS WITH ROLE-BASED AUTHENTICATION

(71) Applicant: Dell Products L.P., Round Rock, TX (US)

(72) Inventors: Vivekanandh Narayanasamy Rajagopalan, Bangalore (IN); Balasingh Ponraj Samuel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 291 days.

(21) Appl. No.: 17/876,530

(22) Filed: Jul. 28, 2022

(65) Prior Publication Data
US 2024/0037238 A1 Feb. 1, 2024

(51) Int. Cl.
*G06F 21/57* (2013.01)
*G06F 21/33* (2013.01)

(52) U.S. Cl.
CPC ............ *G06F 21/572* (2013.01); *G06F 21/33* (2013.01); *G06F 2221/034* (2013.01)

(58) Field of Classification Search
CPC ... G06F 21/572; G06F 21/33; G06F 2221/034
See application file for complete search history.

(56) References Cited

U.S. PATENT DOCUMENTS

| | | | | |
|---|---|---|---|---|
| 9,100,396 B2 * | 8/2015 | O'Connor | ............... | G06F 21/10 |
| 9,894,067 B1 * | 2/2018 | Mandadi | ................ | H04L 63/20 |
| 10,009,337 B1 * | 6/2018 | Fischer | ............... | H04L 67/1097 |
| 10,127,365 B2 * | 11/2018 | Kauerauf | ................ | G06F 21/31 |
| 10,277,569 B1 * | 4/2019 | Barbour | ............... | H04L 9/3228 |
| 10,798,084 B1 * | 10/2020 | Rose | ........................ | H04L 63/20 |
| 10,819,747 B1 * | 10/2020 | Sedky | .................. | H04L 63/105 |
| 11,100,232 B1 * | 8/2021 | Juncker | ................ | H04L 63/102 |
| 12,010,248 B2 * | 6/2024 | Jackson | .............. | H04L 63/0428 |
| 2003/0163685 A1 * | 8/2003 | Paatero | ................ | H04W 12/06 713/155 |
| 2005/0204354 A1 * | 9/2005 | Sundararajan | ............ | G06F 8/71 717/174 |
| 2006/0248083 A1 * | 11/2006 | Sack | .................... | G06F 21/6218 707/999.009 |
| 2006/0277595 A1 * | 12/2006 | Kinser | ................ | G06F 21/6218 726/3 |

(Continued)

*Primary Examiner* — Darren B Schwartz
(74) *Attorney, Agent, or Firm* — .Jackson Walker L.L.P.

(57) ABSTRACT

Disclosed methods for enabling flexible policies for user access to BIOS attribute settings perform operations including creating a BIOS attribute map encompassing one or more configurable BIOS attributes, generating a role-based authorization table associating an authorization role to each of the configurable BIOS attributes, and deploying the role-based authorization table to an information handling system. Responsive to a user launching a BIOS attribute configuration tool, a user role associated with the user is detected and the role-based authorization table is retrieved. Based on the role-based authorization table and the user role, configurable BIOS attributes for the user are identified. The configurable BIOS attributes may then be presented to the BIOS configuration to enable the user to perform configuration operations for the configurable BIOS attributes.

18 Claims, 5 Drawing Sheets

(56) References Cited

U.S. PATENT DOCUMENTS

| | | | | |
|---|---|---|---|---|
| 2007/0156693 A1* | 7/2007 | Soin | ................ | G06F 21/604 |
| | | | | 707/999.009 |
| 2008/0060058 A1* | 3/2008 | Shea | ................ | G06F 21/6218 |
| | | | | 726/4 |
| 2010/0106812 A1* | 4/2010 | Bernabeu-Auban | ...... | G06F 8/20 |
| | | | | 709/221 |
| 2013/0117313 A1* | 5/2013 | Miao | ................ | G06F 21/6245 |
| | | | | 707/E17.005 |
| 2014/0196104 A1* | 7/2014 | Chari | ................ | H04L 63/102 |
| | | | | 726/1 |
| 2014/0230078 A1* | 8/2014 | Graham | ................ | G06F 21/60 |
| | | | | 726/30 |
| 2016/0269417 A1* | 9/2016 | Saxena | ................ | H04L 63/06 |
| 2020/0358778 A1* | 11/2020 | Gopinathapai | ....... | G06F 21/604 |
| 2021/0084048 A1* | 3/2021 | Kannan | ................ | H04L 63/104 |
| 2021/0224409 A1* | 7/2021 | Avanes | ................ | G06F 16/27 |
| 2022/0131868 A1* | 4/2022 | Vernum | ................ | H04L 61/4505 |
| 2022/0400112 A1* | 12/2022 | Cavalcanti | ............ | H04L 63/102 |
| 2023/0063911 A1* | 3/2023 | Carru | ................ | G06F 16/256 |
| 2023/0195858 A1* | 6/2023 | Shah | ................ | G06F 21/44 |
| | | | | 726/27 |
| 2023/0350694 A1* | 11/2023 | Paulraj | ................ | G06F 9/4416 |
| 2024/0154971 A1* | 5/2024 | Siswanto | ............ | G06F 3/0482 |

\* cited by examiner

ENABLING FLEXIBLE POLICIES FOR BIOS SETTINGS ACCESS WITH ROLE-BASED AUTHENTICATION

TECHNICAL FIELD

The present disclosure relates to information handling system management and, more particularly, managing security policies for such systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Enterprises including commercial, educational, industrial, and governmental entities enforce security policies and, more specifically, security policies pertaining to information technology (IT) assets, in various ways. A hardware level access restriction may be enforced via basic input/output system (BIOS) attributes and/or settings. As an example, a policy discouraging anonymous and unmanaged data transfers, may be at least partially implemented by disabling universal serial bus (USB) ports for a team working on banking software or a confidential government project.

While conventional tools and methods for managing BIOS attributes may enable IT decision makers (ITDMs), also referred to simply as IT administrators, to implement and enforce access restrictive policies, functionality for defining the domain or scope of any particular policy may be tied to a setting or privilege having little if any correlation to a desired policy objective. For example, restriction policies may be enforced via an admin password requirement that essentially prevents non-admin users from modifying most if not all configuration settings and imposes a potentially disruptive burden on IT administrators. This example will be recognizable to any office worker who has been unable to perform a seemingly innocuous configuration task such as determining whether the user's device boots up with the NumLock key enabled or disabled.

As a result, IT administrators may be required to plan and implement a potentially elaborate and complex set of policies based on department level restrictions. FIG. 1, which depicts an example password control table 100 in accordance with conventional solutions, conveys this complexity. In some cases, a custom BIOS may be required to implement desired access controls. In addition, the capabilities and settings exposed to users may vary among different types of users, often rendering the majority of end users entirely dependent on IT administrators for configuration changes, regardless of the risk level or sensitivity of a particular setting. In addition, OEM configuration and diagnostic tools run in an elevated administrative context (system user) on the system.

SUMMARY

Subject matter disclosed herein enables ITDMs to define roles and build immutable relationships with BIOS attributes. The BIOS maps attributes with roles to restrict access to highly secure settings while enabling less impactful settings to be modifiable by end users and OEM applications.

In at least one embodiment, disclosed methods define a 3-step process that includes predefining relationships between user roles and BIOS attributes, secure provisioning, either offline at the factory or in-the-field updates, and secure access based on the defined relationships.

In one aspect, disclosed methods and systems include or perform operations for creating a BIOS attribute map encompassing one or more configurable BIOS attributes, generating a role-based authorization table associating an authorization role to each of the configurable BIOS attributes, and deploying the role-based authorization table to an information handling system. Responsive to a user launching a BIOS attribute configuration tool, a user role associated with the user is detected and the role-based authorization table is retrieved. Based on the role-based authorization table and the user role, configurable BIOS attributes for the user are identified. The configurable BIOS attributes may then be presented to the BIOS configuration to enable the user to perform configuration operations for the configurable BIOS attributes.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
FIG. 1 illustrates an example password control table to illustrate issues with conventional systems.

Exemplary embodiments and their advantages are best understood by reference to FIGS. 1-9, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Figure 2:
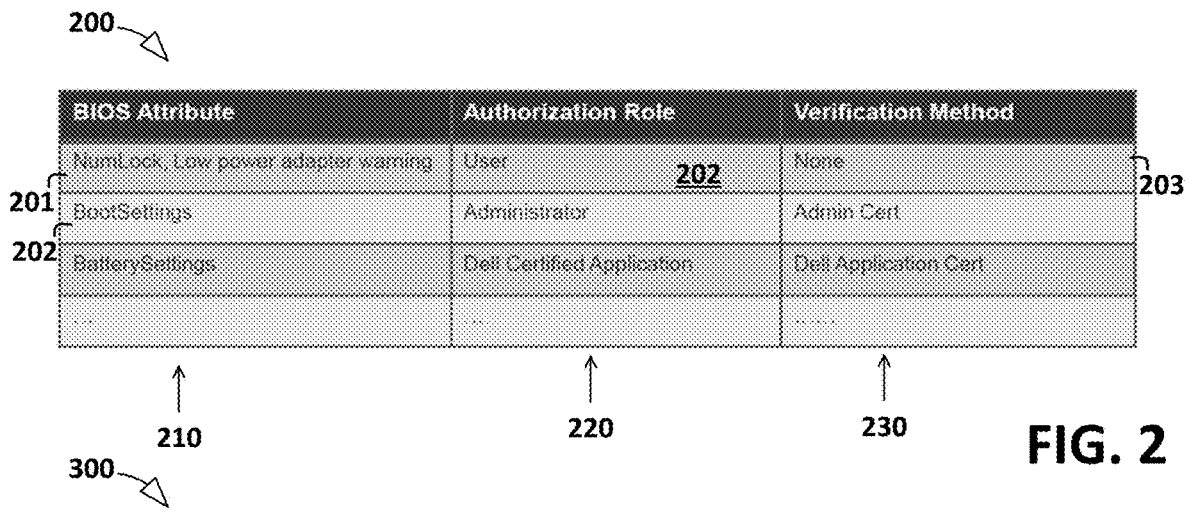
FIG. 2 illustrates a multi-level role-based authorization table in accordance with disclosed subject matter.

Referring now to the drawings, FIG. 2 illustrates an example table 200 for providing multi-level, role-based authorization in accordance with disclosed subject matter. The table 200 depicted in FIG. 2 conveys role-based authorization in which low risk BIOS attributes 201, e.g., NumLock default state, can be configured by any end user without verification while boot settings 202 require administrator status and an administration certificate for verification. Table 200 reflects a multilevel security relationship in which ITDMs establish relations between BIOS attributes, indicated in BIOS Attribute column 210, Authorization Roles indicated in Authorization Role column 220, and Verification Methods, indicated in Verification Methods column 230. For example, an OEM's IT admin tool, e.g., Dell command|configure (DCC), may be associated with an Authorization Role of "Administrator" that permits the tool to access BIOS attributes, e.g., BootSettings, associated with the same Authorization Role as well as BIOS settings associated with a less restrictive Authorization Role, e.g., NumLock, etc. Although FIG. 2 illustrates three distinct Authorization Roles (User, Admin, and Certified Application, other implementations may include more, fewer, and/or different Authorization Roles. Role-based authorization table 200 may be pre-built, in the factory, and signed using an OEM key, using existing signing infrastructure, and then provisioned to a platform resource, e.g., serial peripheral interface (SPI) using a secure provisioning tool. In this way, the relationships defined in table 200 are immutable. Each enterprise may create a role-based authorization table 200 using an OEM role-based BIOS attribute service tool.

Figure 3:
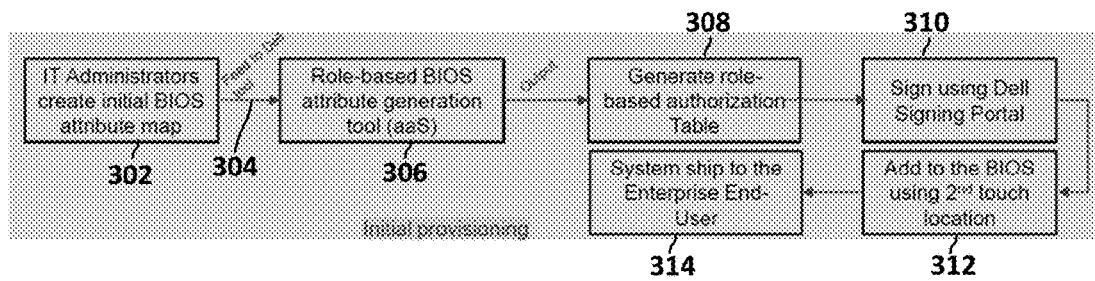
FIG. 3 illustrates an initial provisioning workflow for enabling role-based authorization for accessing BIOS settings.
Figure 4:
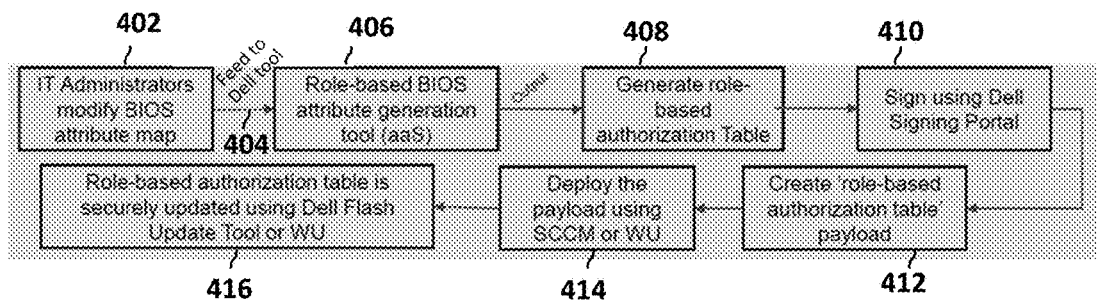
FIG. 4 illustrates a field update workflow for enabling role-based authorization for accessing BIOS settings.

FIG. 3 and FIG. 4 illustrate workflows 300 and 400 respectively for secure provisioning of role-based authorization features described herein. The workflow 300 of FIG. 3 represents a workflow for initial provisioning while workflow 400 of FIG. 4 is a workflow for in-the-field updates.

Workflow 300 begins with the creation (302), by IT administrators, of an initial BIOS attribute map, which is provided (304) to an OEM tool (306) for generating a role-based BIOS attribute authorization table (308), signing (310) the authorization table with an OEM signing tool, adding (312) the table to the BIOS using a verification tool and shipping (314) the system to an enterprise end user.

The field-update workflow 400 illustrated FIG. 4 begins with IT administrators modifying (402) an existing BIOS attribute map and providing (404) the modified map to a role-based BIOS attribute generation tool 406, which may be the same tool as the previously referenced BIOS attribute generation tool 306, to generate a role-based authorization table 408. The table 408 may then be signed (410), again using a signing portal, and a role-based authorization table payload (412) (not explicitly depicted in FIG. 4) is created. The payload (412) may then be deployed (414) using an OS deployment tool such as a system center configuration manager (SCCM) or Windows update (WU) from Microsoft. The authorization table payload is used (416) to securely update via a suitable flashing tool.

Figure 5:
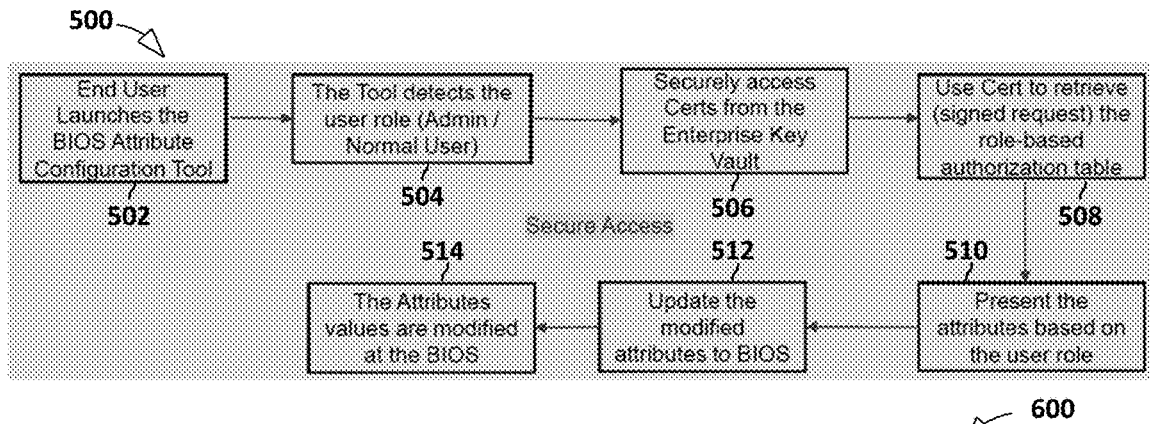
FIG. 5 illustrates a secure access workflow for role-based authorization of BIOS settings.

FIG. 5 illustrates an exemplary workflow 500 for secure accessing of the role-based authorization features. The illustrated workflow 500 begins with an end user launching (502) a BIOS attribute configuration tool. The tool detects (504) the user role, e.g., admin vs. normal end user, and securely accesses (506) certificates from an enterprise key vault. Certificates are used to retrieve (508) a signed request in the role based authorization table and present (510) the attributes based on the user role. If the user modified any attributes, the modified attribute may be used to update (512) the modifIED attributes, at which pOint the attribute values may be committed (514) to the BIOS.

Figure 6:
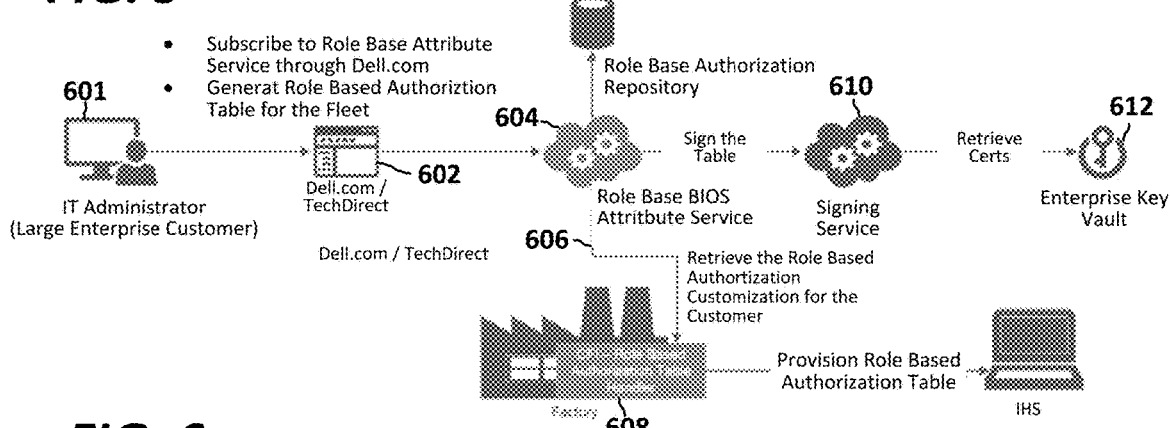
FIG. 6 illustrates an architecture for factory provisioning of role-based authorization for BIOS configuration settings access.

FIG. 6 illustrates example architectural elements of a system 600 for supporting and/or enabling factory provisioning of role-based authorization for BIOS configuration settings access. The enterprise's IT administrator 601 may subscribe and log into an OEM tool (602) to access a role based attribute service (604) and retrieve (606) role based authorization customization from a role based authorization table handler (608). The table is provided to a signing service (610), which signs the table before retrieving appropriate certificates from the enterprises key vaults (612).

Figure 7:
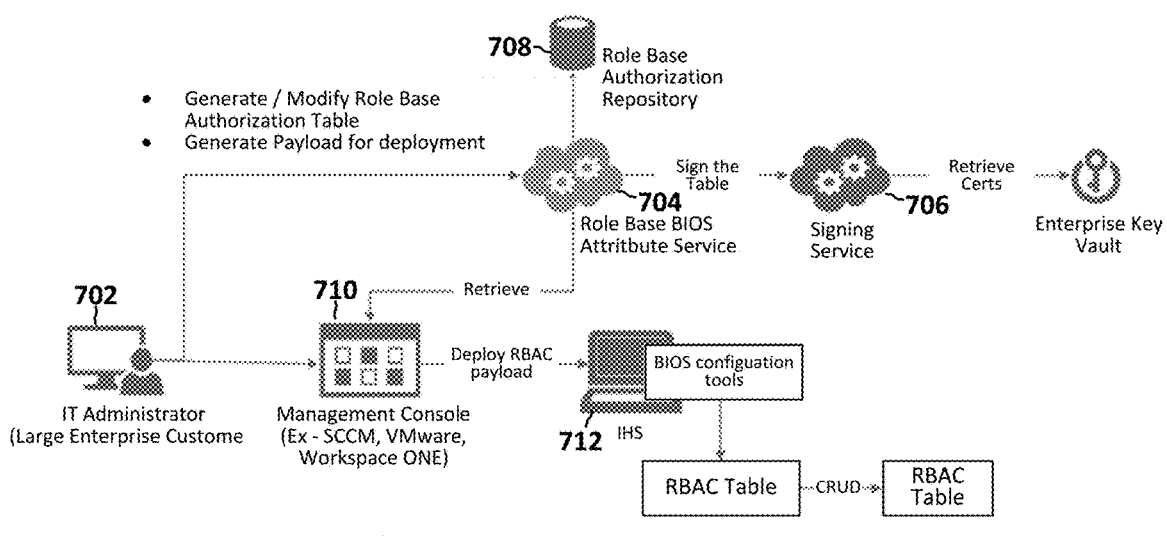
FIG. 7 illustrates an architecture for accessing BIOS settings using role-based authorization during a field update.

FIG. 7 illustrates example architectural elements of a system 700 for accessing BIOS settings using roll-based authorization during a field update. As depicted in FIG. 7, an IT administrator 702 generates a modified role based authorization table via role based BIOS attribute service 704, signs the table via signing service 706, creates a role based authorization table payload and saves the payload to a repository 708. The IT administrator may then retrieve, via a management console 710, e.g., SCCM, VMware Workspace ONE, etc.), the role-based access control (RBAC) payload and deploy the payload to information handling system 712, where a role based authorization table can be securely updated via a suitable flash update tool with create, read, update, and delete (CRUD) features.

Figure 8:
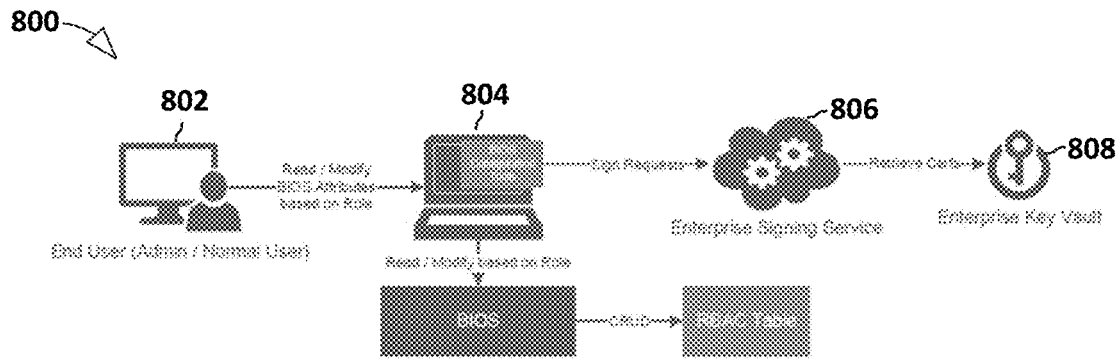
FIG. 8 illustrates an architecture for end user access of BIOS settings using described role-based authorization techniques.

FIG. 8 illustrates an architecture 800 for end user access of BIOS settings using described role-based authorization techniques. An end user 802, whether normal or admin, accesses BIOS configuration tools 804, which invokes signing service 806 to securely access certificates from the key vault 808. BIOS configuration tools 804 may then present to user 802 the BIOS attributes appropriate for the user's role and thereby enable the user to read/modify those attributes.

Figure 9:
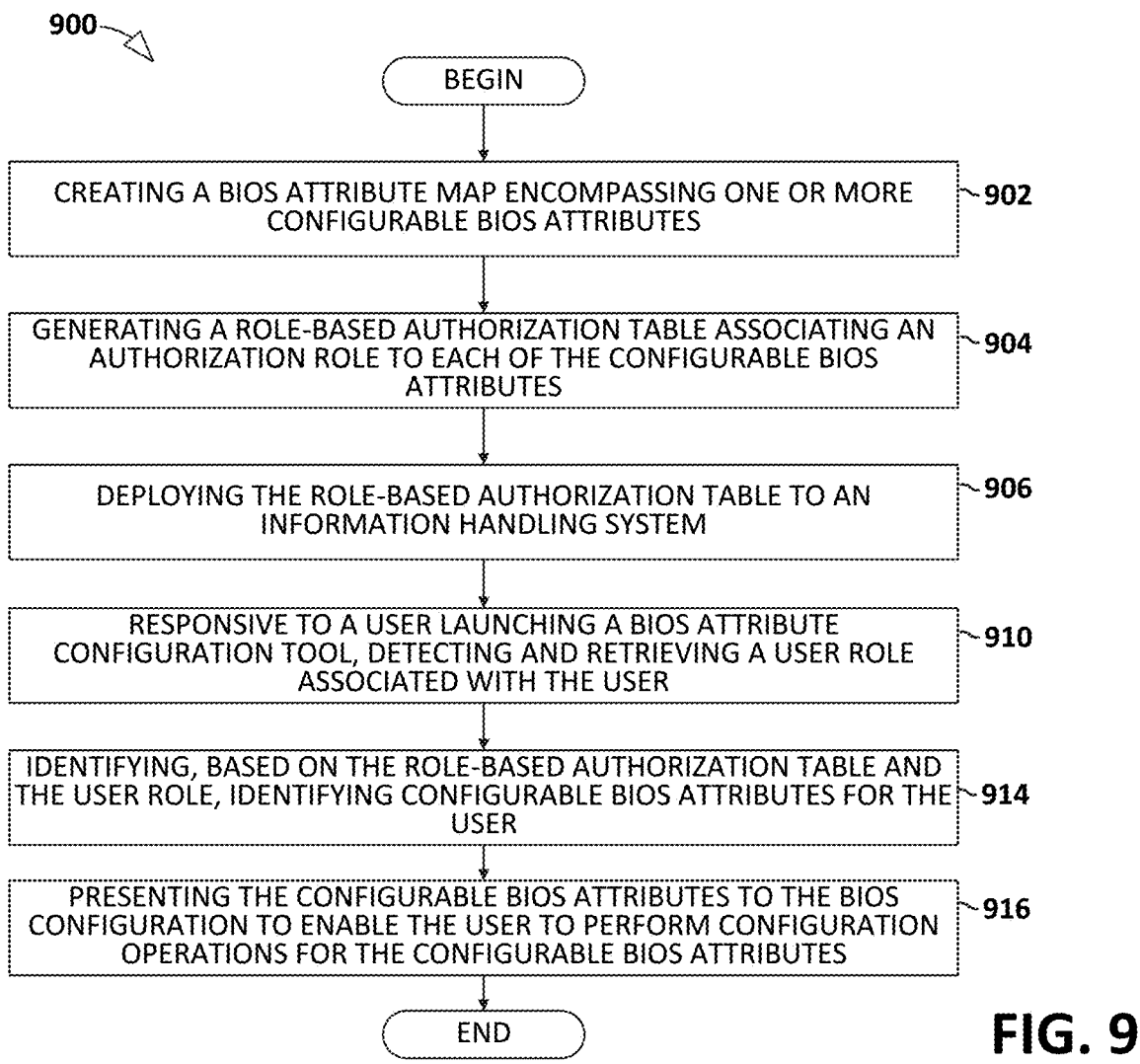
FIG. 9 illustrates a flexible access policy method in accordance with disclosed teachings.

Referring now to FIG. 9, a flow diagram illustrates a method 900 for implementing flexible policies for user access of BIOS attributes using role based authorization. The illustrated method 900 includes creating (step 902) a BIOS attribute map encompassing one or more configurable BIOS attributes. A role-based authorization table, associating an authorization role to each of the configurable BIOS attributes, is generated at step 904 and the role-based authorization table is deployed (step 906) to an information handling system. Responsive to a user launching a BIOS attribute configuration tool, user role information associated with the user is detected (step 910) and retrieved. Based on a combination of the role-based authorization table and the user role, configurable BIOS attributes for the user are identified (step 914). The configurable BIOS attributes may then be presented (step 916) to the BIOS configuration to enable the user to perform configuration operations for the configurable BIOS attributes.

Figure 10:
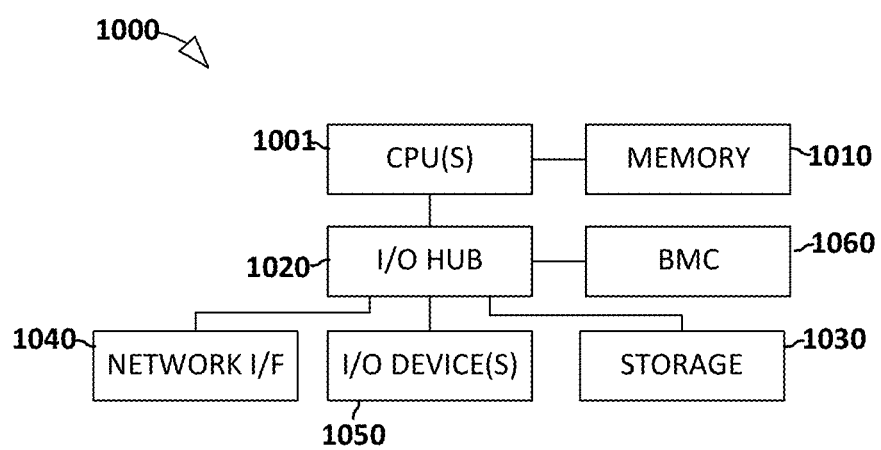
FIG. 10 illustrates an information handling system suitable for use in conjunction with disclosed subject matter.

Referring now to FIG. 10, any one or more of the elements illustrated in FIG. 1 through FIG. 9 may be implemented as or within an information handling system exemplified by the information handling system 1000 illustrated in FIG. 10. The illustrated information handling system includes one or more general purpose processors or central processing units (CPUs) 1001 communicatively coupled to a memory resource 1010 and to an input/output hub 1020 to which various I/O resources and/or components are communicatively coupled. The I/O resources explicitly depicted in FIG. 10 include a network interface 1040, commonly referred to as a NIC (network interface card), storage resources 1030, and additional I/O devices, components, or resources 1050 including as non-limiting examples, keyboards, mice, displays, printers, speakers, microphones, etc. The illustrated information handling system 1000 includes a baseboard management controller (BMC) 1060 providing, among other features and services, an out-of-band management resource which may be coupled to a management server (not depicted). In at least some embodiments, BMC 1060 may manage information handling system 1000 even when information handling system 1000 is powered off or powered to a standby state. BMC 1060 may include a processor, memory, an out-of-band network interface separate from and physically isolated from an in-band network interface of information handling system 1000, and/or other embedded information handling resources. In certain embodiments, BMC 1060 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method comprising:
creating a basic input/output system (BIOS) attribute map encompassing one or more configurable BIOS attributes;
generating a role-based authorization table corresponding to an enterprise, wherein the role-based authorization table associates an authorization role to each of the configurable BIOS attributes;
prior to delivering an information handling system to the enterprise, deploying the role-based authorization table to the information handling system;
responsive to an end user of the information handling system launching a BIOS attribute configuration tool, detecting a user role associated with the end user;
retrieving the role-based authorization table; and
identifying, based on the role-based authorization table and the user role, configurable BIOS attributes for the end user; and
presenting the configurable BIOS attributes to the BIOS configuration to enable the end user to perform configuration operations for the configurable BIOS attributes.

2. The method of claim 1, wherein the role-based authorization table associates a verification method with each of the configurable BIOS attributes.

3. The method of claim 1, further comprising:
responsive to a modification of a configurable BIOS attribute, updating a value of the configurable BIOS attribute in BIOS.

4. The method of claim 1, wherein associating an authorization role includes associating one of a group of authorization roles to each configurable BIOS attribute wherein the group of authorization roles includes a user authorization role associated with low impact BIOS attributes and at least one administrative authorization role associated with at least one of medium impact and high impact BIOS attributes.

5. The method of claim 1, further comprising:
signing the role-based authorization table with a cryptographic key.

6. The method of claim 5, wherein retrieving the role-based authorization table includes:
securely accessing a certificate from a key vault; and
using the certificate to provide a signed request for the role-based authorization table.

7. An information handling system, comprising:
a central processing unit (CPU); and
a computer readable memory including instructions that, when executed by the CPU, cause the information handling system to perform operations including:
creating a basic input/output system (BIOS) attribute map encompassing one or more configurable BIOS attributes;
generating a role-based authorization table corresponding to an enterprise, wherein the role-based authorization table associates an authorization role to each of the configurable BIOS attributes;
prior to delivering an information handling system to the enterprise, deploying the role-based authorization table to an information handling system;
responsive to an end user of the information handling system launching a BIOS attribute configuration tool, detecting a user role associated with the end user;
retrieving the role-based authorization table;
identifying, based on the role-based authorization table and the user role, configurable BIOS attributes for the end user; and
presenting the configurable BIOS attributes to the BIOS configuration to enable the end user to perform configuration operations for the configurable BIOS attributes.

8. The information handling system of claim 7, wherein the role-based authorization table associates a verification method with each of the configurable BIOS attributes.

9. The information handling system of claim 7, further comprising:
responsive to a modification of a configurable BIOS attribute, updating a value of the configurable BIOS attribute in BIOS.

10. The information handling system of claim 7, wherein associating an authorization role includes associating one of a group of authorization roles to each configurable BIOS attribute wherein the group of authorization roles includes a user authorization role associated with low impact BIOS attributes and at least one administrative authorization role associated with at least one of medium impact and high impact BIOS attributes.

11. The information handling system of claim 7, further comprising:
signing the role-based authorization table with a cryptographic key.

12. The information handling system of claim 11, wherein retrieving the role-based authorization table includes:
securely accessing a certificate from a key vault; and
using the certificate to provide a signed request for the role-based authorization table.

13. A non-transitory computer readable medium including processor-executable instructions that, when executed by a processor of an information handling system, cause the information handling system to perform operations, comprising:
creating a basic input/output system (BIOS) attribute map encompassing one or more configurable BIOS attributes;
generating a role-based authorization table corresponding to an enterprise, wherein the role-based authorization table associates an authorization role to each of the configurable BIOS attributes;
prior to delivering an information handling system to the enterprise, deploying the role-based authorization table to an information handling system;
responsive to an end user of the information handling system launching a BIOS attribute configuration tool, detecting a user role associated with the end user;
retrieving the role-based authorization table; and
identifying, based on the role-based authorization table and the user role, identifying configurable BIOS attributes for the end user; and
presenting the configurable BIOS attributes to the BIOS configuration to enable the end user to perform configuration operations for the configurable BIOS attributes.

14. The non-transitory computer readable medium of claim 13, wherein the role-based authorization table associates a verification method with each of the configurable BIOS attributes.

15. The non-transitory computer readable medium of claim 13, further comprising:
   responsive to a modification of a configurable BIOS attribute, updating a value of the configurable BIOS attribute in BIOS.

16. The non-transitory computer readable medium of claim 13, wherein associating an authorization role includes associating one of a group of authorization roles to each configurable BIOS attribute wherein the group of authorization roles includes a user authorization role associated with low impact BIOS attributes and at least one administrative authorization role associated with at least one of medium impact and high impact BIOS attributes.

17. The non-transitory computer readable medium of claim 13, further comprising:
   signing the role-based authorization table with a cryptographic key.

18. The non-transitory computer readable medium of claim 17, wherein retrieving the role-based authorization table includes:
   securely accessing a certificate from a key vault; and
   using the certificate to provide a signed request for the role-based authorization table.

* * * * *